(12) United States Patent
Postrel

(10) Patent No.: US 7,769,630 B2
(45) Date of Patent: *Aug. 3, 2010

(54) METHOD AND SYSTEM FOR ISSUING, AGGREGATING AND REDEEMING REWARDS BASED ON MERCHANT TRANSACTIONS

(75) Inventor: Richard Postrel, Miami Beach, FL (US)

(73) Assignee: Signature Systems LLC, Miami Beach, FL (US)

( * ) Notice: Subject to any disclaimer, the term of this patent is extended or adjusted under 35 U.S.C. 154(b) by 1076 days.

This patent is subject to a terminal disclaimer.

(21) Appl. No.: 10/791,149

(22) Filed: Mar. 1, 2004

(65) Prior Publication Data

US 2005/0021399 A1    Jan. 27, 2005

Related U.S. Application Data

(63) Continuation-in-part of application No. 10/608,736, filed on Jun. 27, 2003, now Pat. No. 6,820,061, which is a continuation of application No. 09/602,222, filed on Jun. 23, 2000, now Pat. No. 6,594,640.

(60) Provisional application No. 60/140,603, filed on Jun. 23, 1999.

(51) Int. Cl.
*G06Q 30/00* (2006.01)

(52) U.S. Cl. ............. 705/14.28; 705/14.31; 705/14.33; 705/14.3; 705/14.36

(58) Field of Classification Search .................. 705/14, 705/40, 1, 14.28, 14.31, 14.33, 14.3, 14.36
See application file for complete search history.

(56) References Cited

U.S. PATENT DOCUMENTS 4,941,090 A    7/1990   McCarthy (Continued)

FOREIGN PATENT DOCUMENTS

WO    WO 99/43168    *  8/1999
WO    WO 00/65502    * 11/2000

OTHER PUBLICATIONS

ClickRewards—Member Agreement http://web.archive.org/web/19980516234621/www.clickrewards.com/NSU_b.html.

(Continued)

*Primary Examiner*—Narayanswamy Subramanian
*Assistant Examiner*—Ed Baird
(74) *Attorney, Agent, or Firm*—Barkume & Associates, P.C.

(57) ABSTRACT

A loyalty or reward point system that utilizes the pre-existing infrastructure of a typical credit card network. In one embodiment, a user makes a purchase at a merchant of a product using a credit card. The merchant contacts the acquiring bank (which may be any type of financial institution but is referred to generically herein as a bank) with which it has contracted for credit card network services, and as known in the art, will get an approval or decline message after the acquiring bank contacts the issuing bank of the credit card used by the purchaser. Assuming that the purchase transaction is approved, the user is awarded loyalty points from the merchant based on the amount of the purchase (e.g. 100 points for a $100 purchase). A central server resides on the credit card network and tracks the transaction between the merchant, the acquiring bank, and the issuing bank. A reward account is maintained on the central server on behalf of the merchant and the user, and the number of reward points in the user's account for that merchant is increased accordingly. In an alternative embodiment, the user's reward points are logged in an account maintained by the acquiring bank on behalf of the merchant (with which it has a contractual relationship) and the user. The user may redeem the reward points earned from the transaction with the merchant at a later time, or may redeem the points with another merchant on the credit card network, or may aggregate those reward points with those of other merchants into a central exchange account, and then redeem the aggregated points for goods or services from any approved merchant on the network, depending on the configuration of the system.

8 Claims, 12 Drawing Sheets

U.S. PATENT DOCUMENTS

| | | | |
|---|---|---|---|
| 5,117,355 A | | 5/1992 | McCarthy |
| 5,202,826 A | | 4/1993 | McCarthy |
| 5,592,376 A | | 1/1997 | Hodroff |
| 5,659,165 A | | 8/1997 | Jennings et al. |
| 5,687,323 A | | 11/1997 | Hodroff |
| 5,689,100 A | | 11/1997 | Carrithers et al. |
| RE36,116 E | | 2/1999 | McCarthy |
| 5,915,244 A | * | 6/1999 | Jack et al. .................... 705/14 |
| 5,956,695 A | | 9/1999 | Carrithers et al. |
| 6,014,635 A | * | 1/2000 | Harris et al. .................. 705/14 |
| 6,032,136 A | * | 2/2000 | Brake et al. ................... 705/41 |
| 6,327,573 B1 | * | 12/2001 | Walker et al. ................. 705/14 |
| 6,334,108 B1 | * | 12/2001 | Deaton et al. ................. 705/14 |
| 6,339,765 B1 | * | 1/2002 | Maher .......................... 705/41 |
| 6,379,247 B1 | * | 4/2002 | Walker et al. ................. 463/25 |
| 6,594,640 B1 | | 7/2003 | Postrel |
| 6,721,743 B1 | | 4/2004 | Sakakibara |
| 7,076,465 B1 | * | 7/2006 | Blagg et al. ................... 705/40 |
| 7,236,950 B2 | * | 6/2007 | Savage et al. ................. 705/34 |
| 2001/0054003 A1 | | 12/2001 | Chien et al. |
| 2002/0026348 A1 | | 2/2002 | Fowler et al. |
| 2002/0029190 A1 | | 3/2002 | Gutierrez-Sheris |
| 2002/0143616 A1 | | 10/2002 | Hajdukiewicz et al. |
| 2002/0143626 A1 | | 10/2002 | Voltmer et al. |
| 2002/0188509 A1 | | 12/2002 | Ariff et al. |
| 2002/0194068 A1 | | 12/2002 | Bishop et al. |
| 2003/0033211 A1 | | 2/2003 | Haines et al. |
| 2003/0050831 A1 | * | 3/2003 | Klayh .......................... 705/14 |
| 2003/0130895 A1 | | 7/2003 | Antonucci et al. |
| 2003/0200144 A1 | * | 10/2003 | Antonucci et al. ............ 705/14 |
| 2003/0225618 A1 | | 12/2003 | Hessburg et al. |
| 2003/0236704 A1 | | 12/2003 | Antonucci |
| 2003/0236712 A1 | | 12/2003 | Antonucci et al. |
| 2004/0215536 A1 | * | 10/2004 | Deliwala et al. .............. 705/34 |
| 2005/0021457 A1 | | 1/2005 | Johnson et al. |
| 2005/0043992 A1 | * | 2/2005 | Cohagan et al. ............... 705/14 |
| 2007/0112631 A1 | | 5/2007 | Voltmer et al. |
| 2010/0088174 A1 | * | 4/2010 | Cohagan et al. .......... 705/14.33 |

OTHER PUBLICATIONS

Asami, S. "Loyalty Card Utilized as a Marketing Tool in Europe and North America", Card Wave, by C. Media Co., Japan, vol. 10, No. 10, Sep. 10, 1997, pp. 14-20. English Translation.

Wada, F. "Customer Loyalty Programs in America: Latin Pass & Frequency Marketing Inc.", Card Wave, by C. Media Co., Japan, Vo. 11, No. 2, Jan. 10, 1998, pp. 50-52. English Translation.

Kim, W.J. and D.H. Kim "A Method for Exchanging Bonus Points", English Translation of Korean Patent Publication 1999-0078768, May 11, 1999.

Sakakibara, "Method and System for Managing Point, Central Unit and Recording Medium", Machine-generated English translation of Japanese Patent publication JP2001-273453; Oct. 5, 2001, http://www19.ipdl.ncipi.go.jp/PA1/result/detail/main/wAAAZHaGlcDA413273453P1.htm.

Chang, H.J. and K.H Kim "Mileage Point Integration System Based on Internet", English Translation of Korean Patent Publication TUK 2000-0012702, Mar. 6, 2000.

* cited by examiner

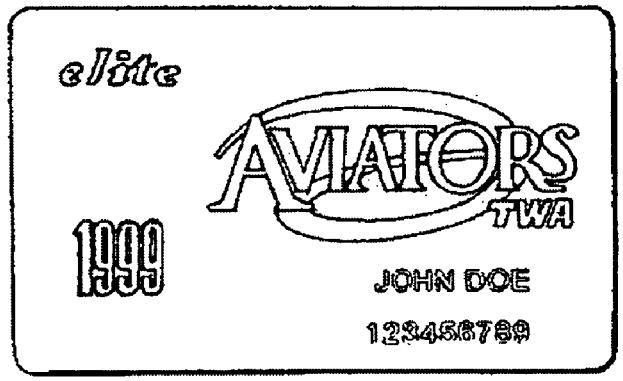
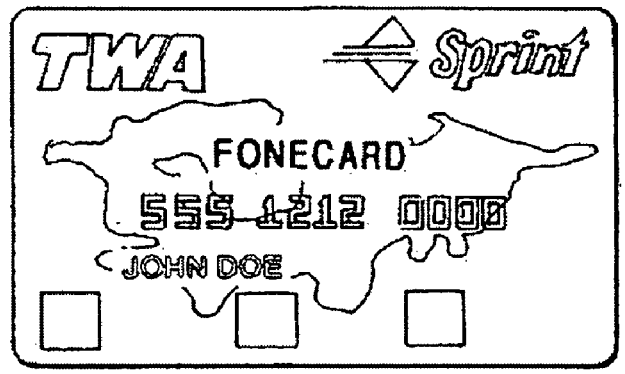
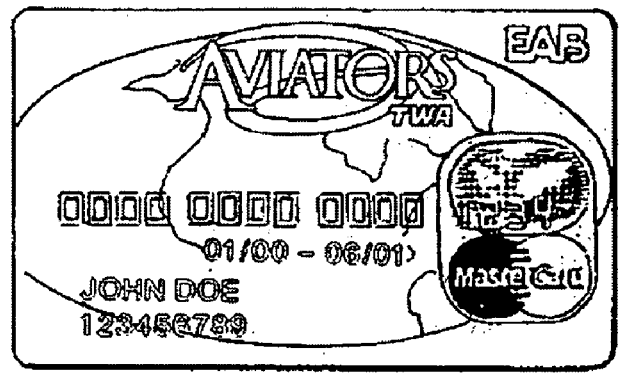
FIG.2
PRIOR ART

Account: John Doe
Account Number: 123456789
Enrollment Date: 12-21-1995
Privilege Card Type: Preferred Total Miles: 12,058
Non-Equity Miles: 967
Equity Miles:
Miles Available for Award Redemption: 11,025

| Activity Date | Type | Origin | Destination | Class | Flight No. | Description | Miles |
|---|---|---|---|---|---|---|---|
| 06-06-1999 | Other Activity | | | | | Hotel | 700 |
| 05-31-1999 | Other Activity | | | | | Credit | 2,725 |
| 05-21-1999 | Other Activity | | | | | Phone | 252 |
| 05-19-1999 | Statement Issued | | | | | STMT BAL | 7,348 |
| 05-18-1999 | Flight | LAX | LGA | Y | 701 | | 2300 |
| 05-16-1999 | Flight | LGA | LAX | Y | 801 | | 2300 |
| 05-16-1999 | Other Activity | | | | | Car Rental | 420 |
| 05-03-1999 | Other Activity | | | | | Hotel | 700 |
| 04-30-1999 | Other Activity | | | | | Credit | 2,908 |
| 04-21-1999 | Other Activity | | | | | Phone | 385 |
| 03-31-1999 | Other Activity | | | | | Credit | 1,870 |
| 02-28-1999 | Flight | LAX | LGA | Y | 701 | | 2300 |
| 02-21-1999 | Flight | LGA | LAX | Y | 801 | | 2300 |

FIG.3 PRIOR ART

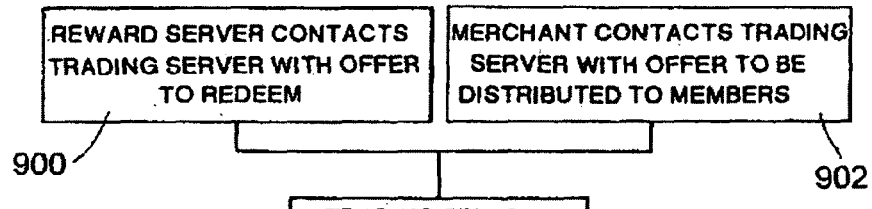
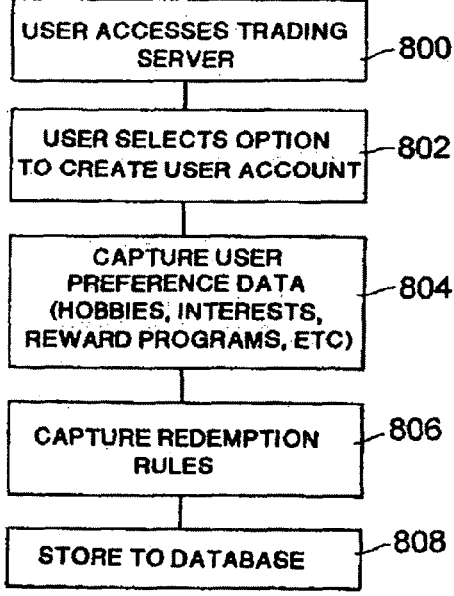
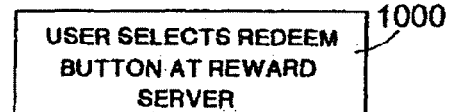

METHOD AND SYSTEM FOR ISSUING, AGGREGATING AND REDEEMING REWARDS BASED ON MERCHANT TRANSACTIONS

CROSS-REFERENCE TO OTHER APPLICATIONS

This application is a continuation-in-part application of application Ser. No. 10/608,736, filed on Jun. 27, 2003, now U.S. Pat. No. 6,820,061, which is a continuation of application Ser. No. 09/602,222, filed Jun. 23, 2000, now U.S. Pat. No. 6,594,640, which is based on and claims filing priority of U.S. provisional patent application Ser. No. 60/140,603, filed on Jun. 23, 1999. This application is also related to application Ser. No. 10/835,550 filed on Apr. 28, 2004 and application Ser. No. 10/809,185 filed on Mar. 25, 2004.

BACKGROUND OF THE INVENTION

This invention relates to loyalty points programs, and in particular to such programs that allow merchants to award loyalty points to users wherein the merchants utilize the pre-existing infrastructure of a credit card network for awarding loyalty points, maintaining account information of users, aggregating loyalty points from various merchant-based loyalty accounts, and redeeming such loyalty points for products and services selected by the users.

In the prior art, in order to attract and retain business customers, airlines, hotels, car rental companies, chain retailers, telecom providers, etc. have historically introduced frequent use programs that offer awards of loyalty or reward points (e.g. frequent flyer miles) or other such incentives schemes based on the distance traveled or purchases made by that customer. Competition has forced airlines to modify the manner in which mileage was acquired to include travel related purchases by consumers. For example, the dollar-based cost of a ticket purchased may be awarded as mileage to a client account. Within the past several years, banks that issue credit cards or other retailers and e-tailers have co-branded credit cards in the name of the airlines and the credit card company where each dollar spent using the card is recorded as a mile of travel or point in the award program. These cards may additionally award bonus miles in coordination with user purchases of preferred products or flights during preferred times.

With regard to FIG. 1, a model of the frequent flyer systems of the prior art is presented. Two different airlines servers are shown surrounded by their related marketing partners. In order to lure more business travelers, the airlines have established marketing agreements with travel related companies to provide the business traveler with a more robust way to generate rewards in the form of frequent flyer miles. These marketing arrangements or associations have typically involved credit card companies, phone companies, hotel chains and car rental companies. Any purchases made through these co-branded partners were then awarded to the user periodically. Bonus miles or points may additionally be accumulated based on the user's actions in response to offers made by the airline or in coordination with the partner company. For example, phone companies purchase reward points or miles and then offer them to their customers based on the customer's agreement to switch to their phone service. These points are obtained by the partner companies by purchasing them from the issuing entity for redistribution as an incentive to utilize their particular goods and/or services. FIG. 2 shows some sample co-branded cards that are representative of marketing agreements between TWA, Sprint, and Mastercard. In order to receive these benefits, the user must sign up with each of the partner companies separately and provide the frequent flyer account number that is to receive the credited reward points or miles. A user either making phone calls or purchases in accordance with the agreements made with each of these partners will first accumulate a value on the partner's system which in turn is periodically updated on the airline's reward server to reflect the value earned during that period. FIG. 3 is representative of a typical user account that shows various earnings in the system transferred in from any of the co-branded partners. The records of the table in FIG. 3 identify the source of the rewards, the dates they were recorded and the number of miles associated with that transaction. The user can view the accumulated miles by accessing the airline's reward server or by tracking the individual value reported to the user through the various bills the user receives from each of the co-branded partners. In any event, the user is faced with an extremely difficult if not practically impossible task of manually coordinating all of his reward accounts to determine how many points may reside in each account, how to redeem points in each account, etc.

Large scale merchants such as chain hotels, chain rental cars, and various airlines are able to implement their own loyalty or reward points schemes since they have the infrastructure in place to maintain user loyalty point accounts. Thus, these large entitles are able to build brand loyalty via their own loyalty schemes. They are able to operate independently by awarding their own loyalty points and redeeming the loyalty points by offering their own products and services. A typical example is when a user earns 35,000 American Airlines points and trades them in for a free flight or upgrade, or when a user earns Hilton Honors points by staying at a Hilton hotel, and redeems them for free lodging at a Hilton hotel.

Mid-size and smaller merchants are often unable to implement their own loyalty programs due to the high cost of the infrastructure required, including server computers that maintain user loyalty accounts and administration costs. For example, a small independent restaurant or pizzeria may want to award loyalty points and allow users to redeem accumulated points for free or discounted meals, but is unable to do so due to the aforementioned high costs involved. As mentioned above, some companies have resorted to purchasing loyalty points from larger companies and then distributing them to their customers, but this does not help build brand loyalty for that company (e.g. MCI gives a customer 5,000 American Airlines points to change to their service, the customer is not getting MCI-branded points).

It is therefore desired to have a loyalty or reward point program that allows any merchant, regardless of its size, to award their own branded loyalty points and allow users to redeem them for their own products or services in order to build brand loyalty for that merchant. It is also desired to allow users to selectively redeem their reward points at other merchants that are part of the network.

Although the building of brand loyalty by merchants of any size and stature is critical, it is also recognized that users may end up with many loyalty point accounts, each having relatively small numbers of points. It may take awhile for a user to build a meaningful sum of points with any one merchant, although there are great advantages to both the consumer as well as the merchant in doing so. It is therefore desired to provide a loyalty point system that allows users to aggregate loyalty points earned from these various merchants into a central exchange account, wherein the aggregated loyalty points may be advantageously used to purchase goods or services from any merchant in the system.

SUMMARY OF THE INVENTION

The present invention implements a loyalty or reward point system that utilizes the pre-existing infrastructure of a typical credit card network, such as the VISA or MASTERCARD credit card networks. In one embodiment, a user makes a purchase at a merchant of a product using a credit card. The merchant contacts the acquiring bank (which may be any type of financial institution but is referred to generically herein as a bank) with which it has contracted for credit card network services, and as known in the art, will get an approval or decline message after the acquiring bank contacts the issuing bank of the credit card used by the purchaser. Assuming that the purchase transaction is approved, the user is awarded loyalty points from the merchant based on the amount of the purchase (e.g. 100 points for a $100 purchase). A central server resides on the credit card network and tracks the transaction between the merchant, the acquiring bank, and/or the issuing bank. A reward account is maintained on the central server on behalf of the merchant and the user, and the number of reward points in the user's account for that merchant is increased accordingly. In an alternative embodiment, the user's reward points are logged in a reward account maintained by the acquiring bank on behalf of the merchant (with which it has a contractual relationship) and the user.

The user may redeem the reward points earned from the transaction with the merchant at a later time, or may redeem the points with another merchant on the credit card network, or may aggregate those reward points with those of other merchants into a central exchange account, and then redeem the aggregated points for goods or services from any approved merchant on the network, depending on the configuration of the system.

As a result, merchants are able to award loyalty or reward points based on purchases made by users without having to implement their own infrastructure; i.e. by using the pre-existing infrastructure of the credit card network with which they have a contractual relationship.

BRIEF DESCRIPTION OF THE DRAWING

FIG. 2 is a representation of the co-branded partners in a prior art award program;

FIG. 3. is a sample of the prior art reward summary from an airline frequent flyer system;

FIG. 8 is a data flow diagram of the user account creation process on the trading server;

FIG. 9 is a data flow diagram of the offer process by a reward program or by a merchant;

FIG. 10 is a data flow diagram of the process where a user may be redirected from a reward program to the trading server of the present invention;

DETAILED DESCRIPTION OF THE PREFERRED EMBODIMENT

Figure 11:
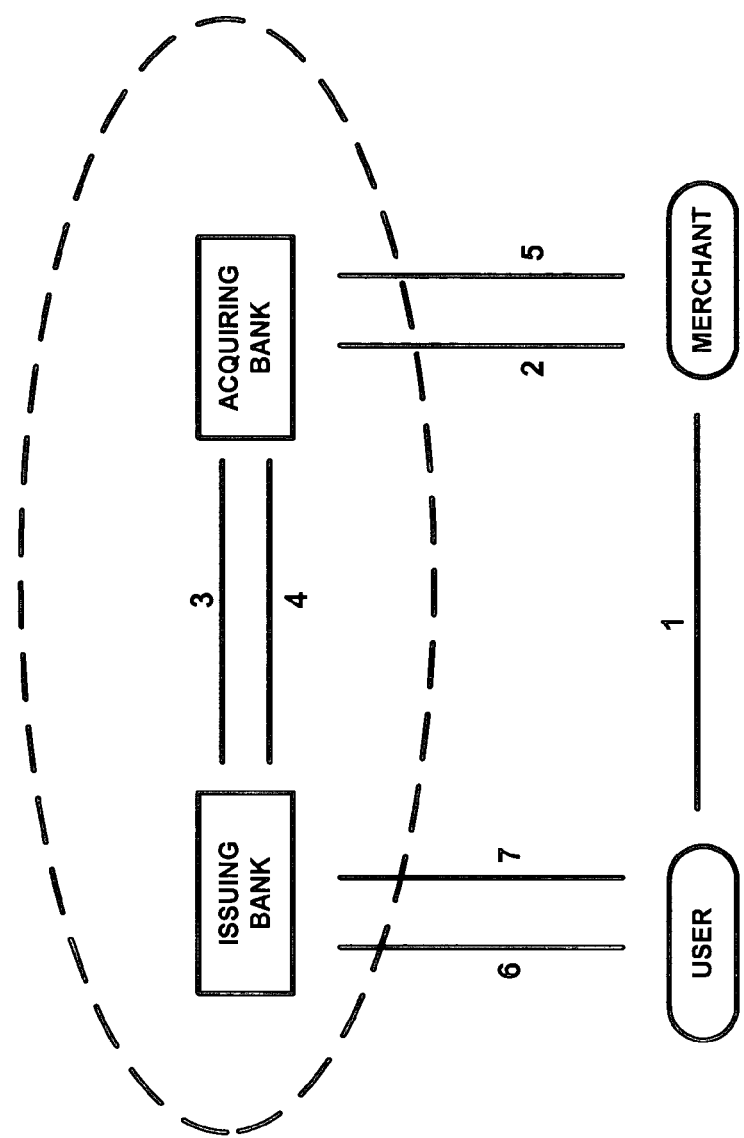
FIG. 11 is an illustration of the process flow in a typical credit card transaction that occurs over a credit card network.

FIG. 11 illustrates a typical prior art credit card network and a credit card transaction between a user and a merchant. The credit card network is comprised of thousands of member banks, wherein a member bank may be an issuing bank or an acquiring bank (or it may fulfill the role of both issuer and acquirer). A consumer or user has a contractual relationship with an issuing bank, which will issue the user a credit card such as a VISA card based on finance terms agreed to between the user and the issuing bank. The user will present the credit card when he desires to make a purchase transaction with a merchant (flow 1). The merchant has a contractual relationship with an acquiring bank, which will agree to pay the merchant after the transaction is approved. When the user presents his credit card to the merchant, the merchant will contact its acquiring bank and request approval of the transaction via the credit card network (flow 2). This is typically done by the merchant swiping the credit card into a POS (point of sale) terminal, but it may be done manually (i.e. over the telephone) as well. In addition, e-commerce sales over a global computer network such as the Internet or an interactive television system may be used under this system. Once the acquiring bank has received a transaction request from the merchant, it determines the issuing bank of the credit card (from the credit card information) and then contacts the issuing bank for approval (flow 3). The issuing bank and the acquiring bank are a part of the credit card network, which may have tens of thousand of such member banks. The infrastructure of the credit card network allows for transactions between acquiring banks and issuing banks as described herein as is well known in the art.

Once the issuing bank receives a transaction request from the acquiring bank, it determines if that user has enough credit to allow the purchase. If the purchase is deemed to be allowed by the issuing bank, it sends an approval message to the acquiring bank (flow 4), and the acquiring bank in turn sends an approval message back to the merchant (flow 5). The purchase transaction may then occur. The issuing bank will pay the acquiring bank the amount (i.e. the requested purchase price) minus an interchange fee (e.g. 1.4% of the price). The acquiring bank will pay the merchant the amount received from the issuing bank minus its own fee (e.g. 0.6%). Thus, the merchant will receive the purchase price minus the entire merchant discount of 2%. For a $100 sale, the merchant will receive $98, the issuing bank retaining $1.40, while the acquiring bank retains 60 cents.

The issuing bank will request payment of the full purchase price from the purchaser, typically in a credit card statement that is issued monthly (flow 6). The risk of collection of the purchase price from the consumer is borne by the issuing bank. The user will pay the issuing bank (flow 7), often on a revolving basis with interest attached.

This type of credit card network thus provides for a merchant to need only one contractual relationship—that with the acquiring bank (and/or the credit card network operator). The merchant is not required to seek payment from the thousands of issuing banks directly—that task is performed as a result of the network architecture. Likewise, the consumer need have only one contractual relationship—that with the issuing bank. The consumer is not required to promise payment to the thousands of acquiring banks directly—that task is performed as a result of the network architecture. These types of credit card networks currently enables over two trillion dollars to be exchanged per year as a result of credit card purchases, and the present day economy would not operate as it does without such networks.

The present invention leverages this pre-existing credit card network and the relationships between member banks to provide for loyalty point accounts and transactions not possible in the prior art due to their high costs if operated independently as done by large entities such as airlines and hotel chains. In this embodiment, the merchant is desirous of awarding loyalty or reward points to a purchaser for the purchase of its products or services. The merchant wants to award loyalty points that are directly branded by that merchant, rather than having to purchase loyalty points from a larger entity such as an airline and distribute them to their customer as in the prior art. In a preferred embodiment, a central server computer will monitor transactions over the network between acquiring banks and issuing banks and determine if loyalty points are to be logged into an account at the central server based upon information contained in the exchanged data. In another embodiment, the merchant will leverage the account with the acquiring bank that it already has a contractual relationship with for purposes of the credit card network by instructing the acquiring bank, as part of the credit card purchase transaction previously described, that the purchaser who presented the credit card should receive loyalty or reward points based on the transaction at a predetermined rate, such as one point per dollar spent. In either embodiment, for example, for a $100 purchase, the purchaser will receive 100 points in an account under his name (or other identification indicia—likely his credit card account number). The merchant may inform the purchaser that he has received 100 of that merchant's loyalty points based on the transaction. In fact, the merchant will likely advertise that he is awarding loyalty points under his brand for purchases made at his store. For example, the Smith Pizzeria will advertise that a $100 purchase will yield 100 "Smith Pizza Points" for a purchaser. The merchant here is able to provide this feature without having to establish an expensive infrastructure (i.e. sever computers, administrators, etc.) as in the prior art. Likewise, it is able to award its own branded loyalty points as not seen before in the prior art (rather than simply distributing airline points or hotel points). In addition, the system may be configured so that the credit card network operator that operates the central server (e.g. VISA or MASTERCARD) is co-branded with the local merchant awarding the loyalty points. Thus, the loyalty points may be referred to as "Smith's Pizza/VISA Points", or "BLOCKBUSTER/VISA Points", or "GAP/VISA Points", etc.

The merchant is thus able to leverage its pre-existing contractual relationship with the acquiring bank and the credit card network, and either the central server (in one embodiment) or the acquiring bank (in another embodiment) will keep track of the loyalty points awarded by the merchant to all of its customers. Similarly, hundreds or thousands of similar accounts with other merchants will be kept track of in the same manner.

Figure 12:
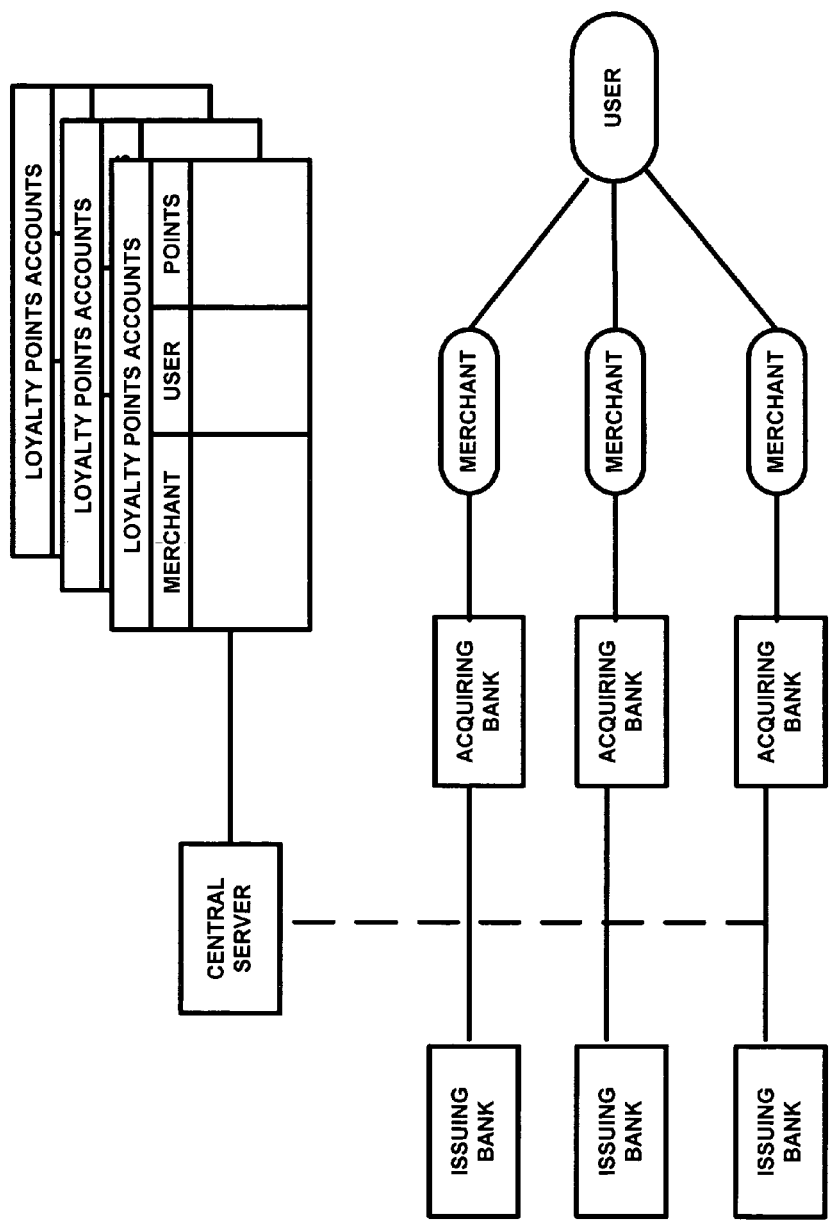
FIG. 12 is an illustration of a database structure for the maintenance of merchant-issued loyalty points by a central server computer in accordance with one aspect of the present invention.
Figure 13:
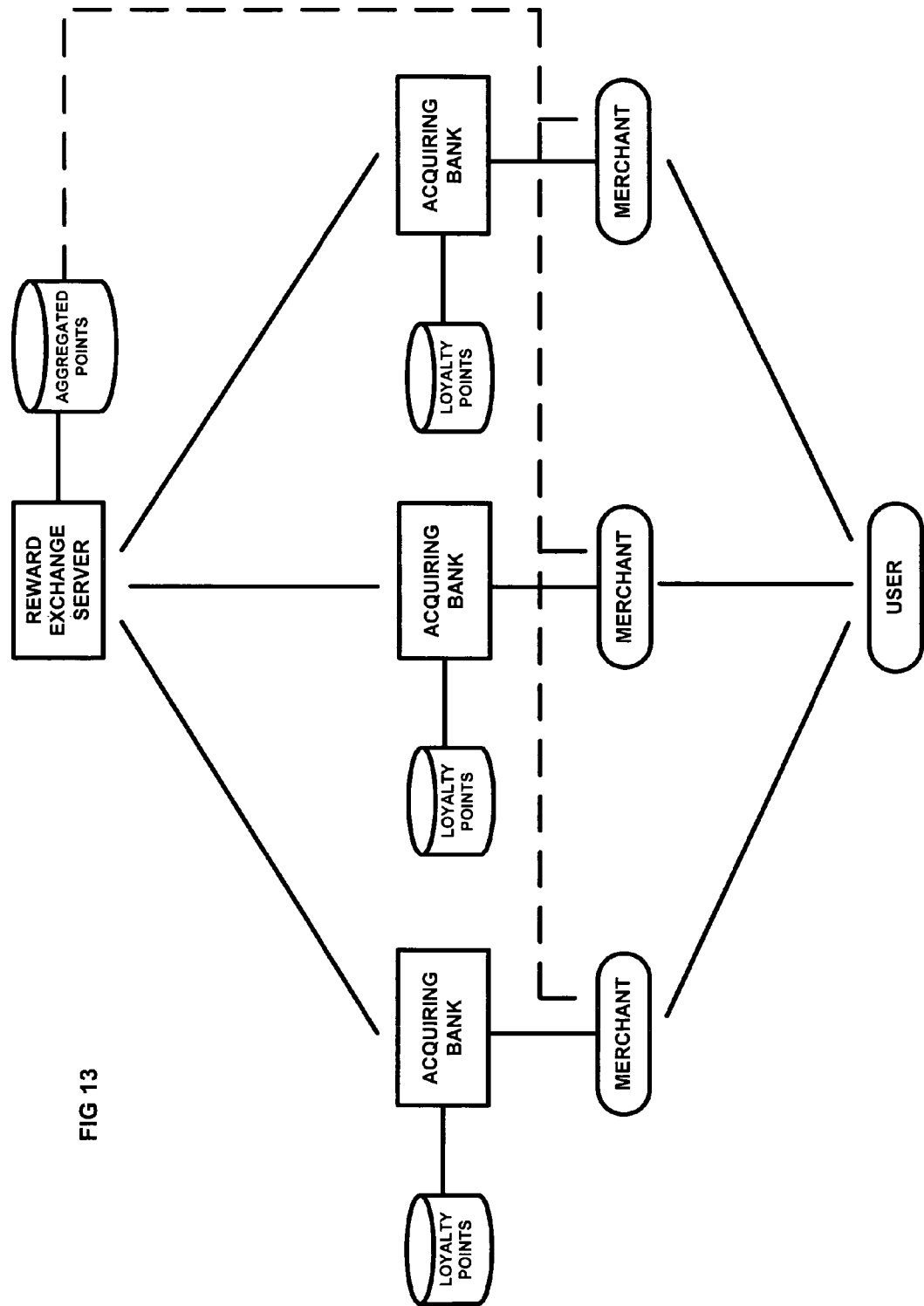
FIG. 13 illustrates the aggregation of reward points from various acquiring bank loyalty accounts.
Figure 14:
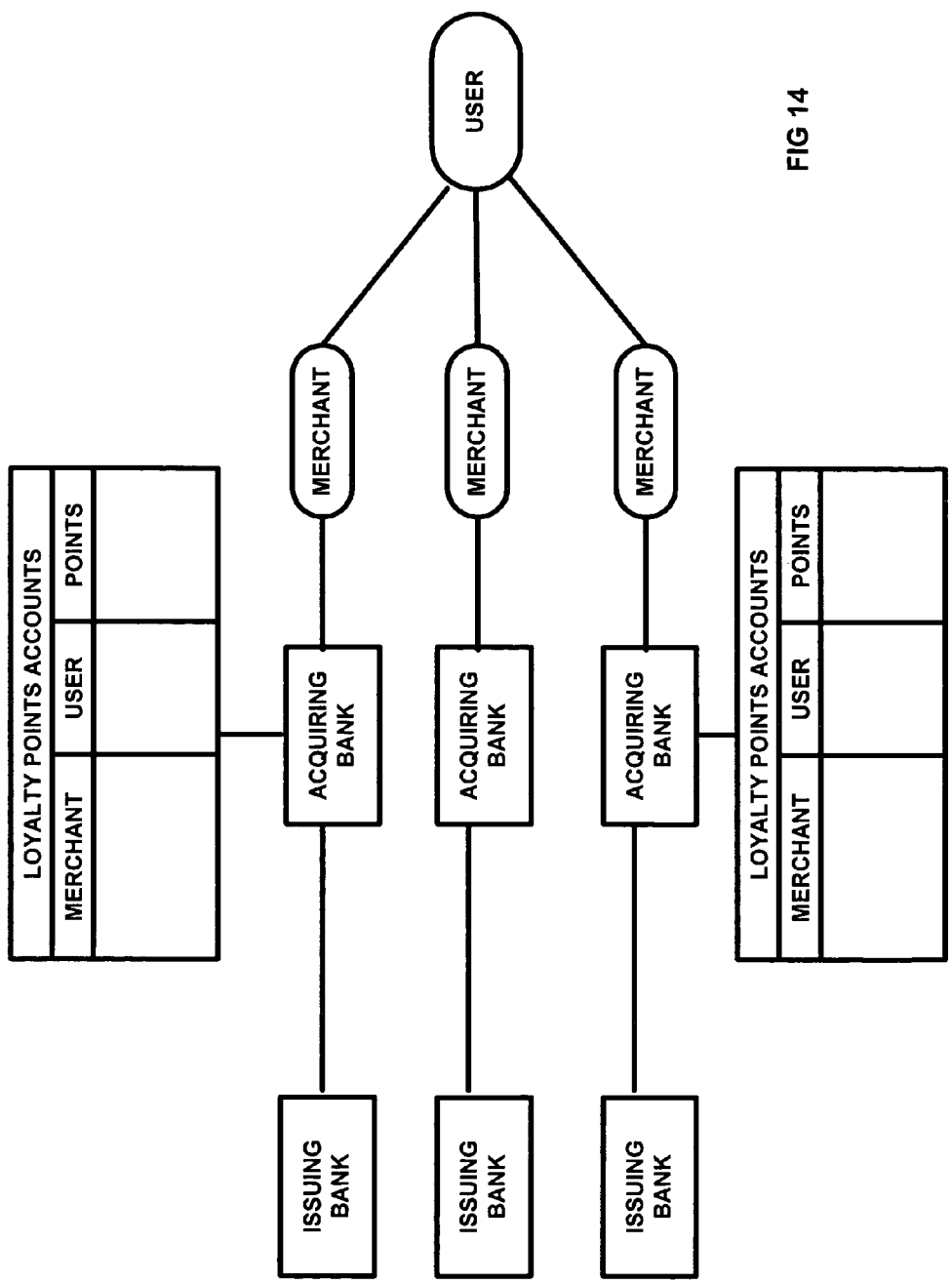
FIG. 14 is an illustration of a database structure for the maintenance of merchant-issued loyalty points by an acquiring bank in accordance with another aspect of the present invention.

The maintaining of these merchant loyalty points may be undertaken by storing user and merchant account information in a database associated with the central server as shown in FIG. 12. Thus, FIG. 12 illustrates a simple database format wherein each merchant and user under that merchant has a record which indicates how many points are in the account, as well as other optional information (such as par value of points, restriction on use, etc.) The format of the storage of the information is unimportant and may take many forms as well know in the art of relational and other types of databases. A simple transaction log may keep information on each transaction processed by the acquiring and issuing banks; this log may be easily modified to include loyalty point information as well. Thus, there may be a setup fee charged by the credit card network operator to initiate the loyalty program for a merchant, as well as transaction fees that provide for a small percentage of revenue to the credit card network operator for each transaction made by the central server.

Preferably, the user is able to view his loyalty point account balance by logging into a web site run by the central server. Optionally, the merchant may have a link on its web site so that the user can check his account, or there may be a redirection to the central server web site, etc. The user may also be able to place a telephone call and, using well know techniques for acquiring information via DTMF tones or audible instructions, obtain account information. The purchaser need not even know that the account is being held for him by the central server since the central server will operate in the "back office" aspect of this invention, thus rendering the specific procedures transparent to the user and providing a great ease of use of the system.

Thus, a purchaser may build up many similar loyalty accounts simply by using his credit card for making purchases as he has done so in the past. The system may be configured to not even require a separate "frequent use" account number to be entered at the POS, since this is many time cumbersome for a user. Experience teaches that many users do not even bother with obtaining frequent use or loyalty points (i.e. from major entities such as Hilton Hotels) since the time and effort in opening a separate account, remembering the account number or carrying a separate membership card, remembering their PIN, etc. is simply unmanageable. The acquiring bank may simply tie in the loyalty account data to the user's credit card number and a merchant ID setup for each merchant.

Although some issuing banks have their own reward point program (such as MBNA's MASTERCARD), these programs award points to a user based on their credit card use at a merchant, but the loyalty program inures to the benefit of the issuing bank, and not the merchants themselves. That is, a user gets MBNA points and obtains the account information on his MBNA statement, but there is no branding or loyalty based on a transaction with a given merchant as in the present invention. Moreover, the present invention provides for redemption of points and aggregation of points in a manner not possible with a prior art issuing bank loyalty program (the items that can be obtained with issuing bank points are quite limited and often render the benefits meaningless).

Under this invention, each purchaser/cardholder enjoys the benefits of being an independent account holder, earning loyalty points with every merchant that elects to participate under the system. Likewise, each cardholder may execute a transaction wherein points are purchased from the network operator, an acquiring bank, an issuing bank or a merchant, at a discount rate that will provide transaction fees for the points issuer/distributor accordingly. The purchased points may be redeemed, or they may be given to others as a gift, or sold to others, etc. The points have a par value that may increase or decrease. The system may be configured so that there are no restrictions on their transfer) i.e. so that they are fungible and fully transferable).

Although the present invention has been described with respect to the use of a credit card, the invention will operate in the same manner with the use of debit cards or check cards that are becoming popular today. That is, the methodologies employed do not vary significantly when a debit card is used (except that the purchaser's account is debited immediately by the issuing bank rather than billing the purchaser later on) rather than a credit card. The present invention includes the use of such debit cards modified as may be required to operate with the same advantages as herein described.

Likewise, the present invention may be advantageously adapted to provide merchant-based loyalty points based on cash transactions as well as the aforementioned credit card and debit card transactions. Cash transactions still make up a substantial portion of purchases, and it would be beneficial for a merchant to provide loyalty points to purchasers using cash in addition to those using credit or debit cards. This will further increase loyalty to that merchant. In this case, the purchaser would still have to present some identification such as his credit card (if the credit card number is being used for unique identification of the purchaser and indicating his loyalty account with the central server). Thus, for example, if a purchaser pays $50 in cash for an item at a store and presents his credit card, the credit card may be swiped at the POS for the sole purpose of awarding him 50 reward points at the acquiring bank server.

In situations where a customer may not be creditworthy, or simply may not want to have any credit cards or debit cards, a "dummy" card may be issued that takes the shape and form of a credit card, along with branding by the issuer, and which may have the logo of the credit card network imprinted thereon, but which is not tied to a credit account or a debit account of the user. The card is used to link the user to a loyalty points account in the same manner that an actual credit or debit card is linked. (In addition, when the user wishes to redeem his loyalty points, the points may be utilized for a purchase by presenting the card and swiping it into the POS terminal in a manner similar to a credit presentation.)

In the present invention, reward points accounts for a user shopping at a merchant may be opened and awarded automatically, or the system may require an enrollment process by the merchant, in which the merchant has the opportunity to capture relevant demographic and other data regarding the users.

Once the purchaser has earned loyalty points with this invention, he or she may choose to redeem his loyalty points in any one of various manners. In one embodiment, the purchaser will execute a purchase transaction with the merchant directly, and indicate that he wishes to utilize his loyalty points to pay for the item in full or in part. For example, the purchaser may want to use 5,000 of his Smith Pizzeria reward points (worth one cent per point) to reduce the purchase price of a meal for his family from $75 to $25. He indicates this to the merchant at the point of sale (which may be over a web site or physically at the restaurant). In the event that he presents his credit card to make his partial payment, then the same approval process takes place as described above. In addition, the purchaser's loyalty account is reduced by the number of designated points (i.e. 5,000 points). This is easily done in this scenario since the central server is tied into the credit card network and can be easily accessed by the acquiring and issuing banks. The merchant issues an instruction to reduce the loyalty account accordingly. In this case, the issuing bank will pay the acquiring bank $25, and the acquiring bank will pay the merchant $25 and cause the central server to reduce the appropriate loyalty point account by 5,000 points (the discounts mentioned above will be also taken by the member banks). As a result, the Smith Pizzeria has now provided a very powerful loyalty scheme without any significant investment in infrastructure that would be required had it not used the infrastructure of the member banks of the credit card network. By paying a modest transaction fee (i.e. a chargeback), the merchant has gained significant loyalty power that was heretofore unavailable.

In a further embodiment, the user/purchaser may aggregate reward points from more than one loyalty point account to increase his purchasing power. That is, he may have dozens or even hundreds of similar reward accounts with the various merchants with which he does business; such as hardware stores, movie theaters, car washes, video rental stores, gas stations, hotels, airlines, etc. Since any type of merchant that accepts a credit card such as VISA or MASTERCARD is empowered with a custom-tailored loyalty program (or a global universal network based rewards program) under this invention, there is virtually no limit to the number and type of loyalty accounts that a user may have.

Loyalty points aggregation is undertaken by an exchange server, which may be on the same computer as the central server that stores the loyalty point records for each merchant and user. The exchange server allows a user to view his loyalty points portfolio easily (such as on a web page), it allows the user to manage the exchange of loyalty points from any of his individual merchant accounts into his exchange account, and it allows the user to execute purchase transactions with his aggregated loyalty points. For example, user John Doe may establish an exchange account with VISA directly, and VISA will use his account number (with appropriate security procedures) to determine all of the loyalty database records on the central server. John Doe will not need to enter dozens or even hundreds of account numbers, since his loyalty accounts will be tied directly to his credit card number. Once the central exchange server obtains his loyalty points information from the various databases and separate accounts, it will generate a web page to display the account totals to the user. The user can then instruct the central exchange server to exchange points into his exchange account from selected accounts as desired. Consideration will be provided from the merchant to the central server that correlates to the number of points exchanged. So, for example, if the user requests that 5,000 points be transferred from his Smith Pizzeria loyalty account to his VISA exchange account, then the Smith Pizzeria account will be reduced by 5,000 points and the acquiring bank will transfer $50 (minus a merchant exchange fee) to the VISA server. The Smith Pizzeria acquiring bank will invoice the merchant by the reduced amount, which may for example be $30. The purchaser will no longer be able to obtain a direct loyalty discount for those points with the merchant since he has exchanged them into his central account. (He may still be able to redeem his exchange points with that merchant as part of a network-based transaction, described below).

Aggregation of reward points by an exchange server also allows a user to use different credit cards with the same merchant and combine the points in one purchase. That is, in the event that a purchaser uses more than one credit card at different times to make his purchases at a merchant, then his loyalty points will be stored on different accounts at the central server. The purchaser can later aggregate those points by the exchange server into one account, by indicating the different credit card numbers to the exchange server and instructing the exchange server to aggregate the points from the various accounts on the central server. This may be done for groups of cards such as when various family members hold cards on the same account. It is noted that the user may optionally be able to use the different credit cards at a POS with the merchant and obtain loyalty point redemption directly for the different accounts at the merchant with needing to use the exchange server.

When the purchaser utilizes the exchange server for aggregating his or her loyalty points from various merchants, exchange rates may be set wherein the purchaser loses some points or value as a transaction fee based on the exchange. So, for example, the purchaser may only net 3,000 exchange points for the above transaction in which 5,000 merchant points are exchanged. The actual exchange rate and fee structure may be set amongst the merchants and the exchange server operator in order to provide a fair compensation scheme for each party while maintaining the benefits of the system, including the building of merchant loyalty and the ability of the consumer to use his loyalty points in ways heretofore unavailable.

The purchaser may repeat this type of transaction with any or all of his accounts and aggregate them into his exchange account for the purpose of purchasing an item that he may otherwise be unable to obtain with the points aggregation. For example, he may aggregate 3,000 points from one account, 7,000 from another account, and 10,000 points from another to provide a total of 20,000 exchange points in his central account. Although the system greatly advantages mid-sized and smaller merchants that have no independent loyalty programs, the consumer may also be able to exchange points from outside the network; i.e. from airlines or hotel chains, into his central exchange account.

After the purchaser has aggregated his desired points, he may execute a purchase transaction with those points. In the preferred embodiment, the purchaser may purchase any item at any merchant that accepts his credit card—which will be virtually every merchant. The aggregated loyalty points will reduce the purchase price by the number of points surrendered by the purchaser for that transaction. In this case, the merchant may be required to pay a small transaction fee to cover the administrative cost of utilizing aggregated reward points under the invention. The purchaser may pay for all or part of the purchase with aggregated points. When the purchase executes the transaction, the number of designated points is taken from the aggregated account, and corresponding consideration is transferred to the appropriate merchant (minus a transaction fee). As an option, the transaction fee for a merchant may be lessened or even waived if the purchase is made with loyalty points issued by that merchant (as opposed to loyalty points from another merchant).

The present invention allows for a transaction executed with reward points to bypass the acquiring and issuing banks and proceed directly with the central server, assuming that the user has enough points in his separate loyalty and/or exchange account(s). In the event that part of the purchase must be made with the credit card, then payment of the balance would be redirected to the acquiring bank and issuing bank as done in the prior art for regular purchases.

In an alternative embodiment, the purchaser may select an item from a catalog of items provided in conjunction with the central exchange account. For example, in the VISA embodiment, VISA may partner with an entity or entities that can provide to it a catalog of items for sale. The purchaser can easily link to that catalog and make a purchase accordingly.

In an alternative embodiment, an issuing bank may fill the role of the exchange server. Since the issuing bank of the purchaser is already a member of the credit card network, it can leverage its network membership to obtain account information from each of the acquiring banks and execute requested exchanges as directed by the purchaser and described above. Once the points have been aggregated by the purchaser, he may make a purchase transaction with any merchant that will accept his credit card. He can indicate that he is making the purchase with aggregated points only, with points and credit, etc. This may be done easily over a web site if it is an ecommerce transaction, or it may be done at the physical point of sale. In the alternative, the purchaser may simply choose to pay full price at the POS and then reduce his bill from the issuing bank by a corresponding amount of aggregated loyalty points.

In an alternative embodiment, the role of the loyalty point account holder at the merchant level may be filled by an acquiring bank instead of the central server as described above. In this case, an account is maintained on behalf of the merchant and the purchaser by the acquiring bank with which the merchant has a pre-existing contractual relationship. Since all acquiring banks have pre-existing relationships with at least one merchant, they can readily provide transaction information regarding loyalty points awarded by individual merchants.

In one aspect of the invention, the merchant is the entity that essentially funds the administrative costs and overhead of the loyalty program. Thus, the merchant has acquired entry into a powerful loyalty program and robust customer acquisition program in exchange for paying nominal transaction fees on points issuance and/or aggregation and/or redemption against the incremental revenue gained due to the loyalty program. Unlike a network-funded loyalty system, which provides nominal incentives and is highly restrictive with no meaningful awards obtainable, the present invention eliminates restrictions if desired and provides a broad-based points issuance, aggregation and redemption network.

In a further embodiment of this invention, a methodology referred to herein as cluster marketing is employed. A cluster may be defined by a group of partner merchants that are related in virtually any manner as defined by the cluster. For example, an entertainment cluster may be defined by a pizzeria, a video rental store, an ice cream shop, a movie theater, and a music store. The cluster may exist in a given geographic location such as a certain town, or it may be extended into larger regions or across the country, etc. Once a cluster is defined, each member will award their own branded loyalty points as described above (or branded with the cluster itself, if desired), and the central server (or acquiring bank for each cluster partner) will maintain user loyalty accounts based on purchases made by a user with a credit card at that location. An exchange account is also created for each user and maintained by the credit card network, an independent entity, an acquiring bank, or an issuing bank as described above. In this embodiment, only loyalty points from cluster partners may be aggregated with each other into the central server points aggregation account. Thus, the user may aggregate his loyalty points from his pizzeria account, his ice cream store account, and his movie theater account, since they are partners in the same cluster. They may or may not carry the same par value. He may then make a purchase from any of the cluster partners and utilize his aggregated loyalty points to pay for the item in whole or in part. He may also use his loyalty points from one cluster partner to pay for products from another cluster partner, even if not aggregated on the exchange account.

By implementing a cluster partner methodology as described, each cluster partner may advertise the existence of the cluster and the partners involved, which will help each partner drive business within the cluster for the purchase of a given product or service. That is, if a consumer is a member of a given cluster, he is more likely to use the products and services of other members of that cluster in order to build his aggregated loyalty points quicker than if he used merchants not in that cluster. Thus, although each cluster partner has gained an advantage by offering his own branded loyalty points as previously unavailable in the prior art, each partner has also benefited from the marketing powers of his cluster partners to drive business within the cluster.

As mentioned above, clusters may be defined in any way by the system. A cluster may be defined by business groups such as an attorney cluster. This type of cluster may include merchants commonly used by an attorney, such as an office products supplier, an accountant, a legal research firm, etc. A homemaker cluster may be defined by a supermarket, a dry cleaners, a bank, a florist, and a hairdresser, etc. Likewise, a cluster may be defined by similar merchants across various regions. For example, a limousine cluster may be defined by a group of independent limousine operators across the country (e.g. all services that operate at an airport) so that a traveler may be have incentive to use only those services when he travels, gaining the benefits of increased loyalty points aggregation by using those services.

The system in this embodiment will thus include many clusters, and some merchants may in fact be members of different clusters if permitted by the member agreements. Groups of clusters may also form marketing agreements amongst themselves to allow points aggregation amongst clusters.

In a further embodiment of the invention, the system may operate to include certain types of businesses in an exclusive manner. For example, the system may be adapted to include only one pharmacy chain store, such as WALGREENS, as part of the loyalty network. In this case, WALGREENS would be the only pharmacy store that would issue branded loyalty points that could be aggregated with other loyalty points as described above, both within as well as outside a cluster. The system may also be adapted to allow other smaller pharmacies to operate in the loyalty point scheme if desired.

A merchant may choose to opt out of the system redemption process and accept points only that it previously awarded.

Loyalty points aggregation is described in full detail in U.S. Pat. No. 6,594,640, owned by the assignee of the present invention, which is incorporated by reference herein. As described in the '640 patent, and with reference to FIG. 4, a plurality of reward server computers 10, 12, 14, a trading server 20, a merchant computer 30 and a user computer 40 are shown in communication with a network 40. The network may comprise any type of communication process where computers may contact each other. The present invention will be described with respect to an Internet-based network where the reward server computer 10 is associated with an airline frequent flyer program. Any type of reward server may also be used in this system. The reward server computer may be a credit card reward program such as offered by American Express where the user earns rewards based on purchases or an advertising based award program where the user earns rewards by selecting advertising content.

Figure 1:
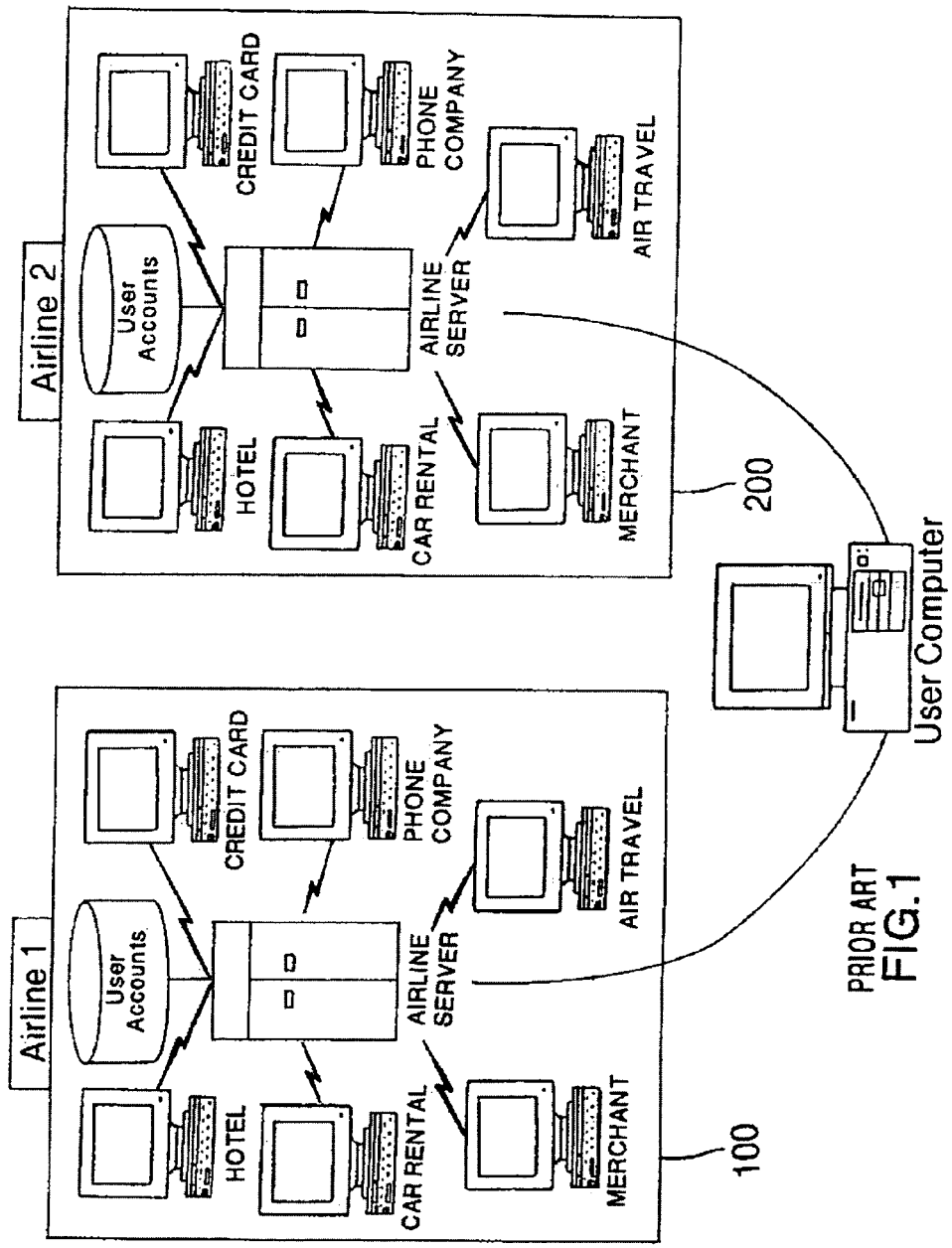
FIG. 1 is representative of the prior art marketing arrangements used in reward programs.

A user of this system may acquire and accumulate rewards through any prior art means such as shown on FIG. 1, which are then posted in a user's reward account 52 that is accessible through the reward server computer 10. The trading server computer 20 is in communication through the network 2 with a user on a user computer 40 and is additionally able to connect to the reward server computers 10, 12, 14 through the network 2 in accordance with techniques well known in the art for Internet communications. The merchant computer 30 is representative of any site that can communicate with the network that has goods or services for sale or trade. The merchant may have a direct relationship with the trading server where the direct relationship allows for a streamlined process for allowing a user to acquire products offered via the merchant computer. Alternatively, the merchant computer may be an independent merchant that does not currently have a profile defined in the trading server that will accept payment from another computer system in any one of well known e-commerce embodiments.

The rewarding entities may be any type of entity that has a service for allocating points or consideration for user actions. The reward server computers 10, 12, 14 may be of any type of accessible server capable of holding data about a user along with a corresponding earned value that is negotiable for other goods, services, or points of another system. In the preferred embodiment, the airline reward server computer 10 may refer to one or several different airlines that have frequent flyer programs or the like. The credit card reward server computer 12 may refer to any type and number of credit card server systems capable of holding, increasing or decreasing a user's earned rewards acquired according to the terms of the credit card program to which the user has enrolled. The marketing reward server computer 14 may refer to one or a multitude of network accessible marketing systems that allow a user to have an account where points or other redeemable value may be stored, updated and redeemed by a user. The trading server computer may be any type of computer system that allows users to access the system in order to perform the processes involved in this invention. In the preferred embodiment all of the systems described are accessible through the Internet and the user may freely navigate to any site by means well known in the art.

The present invention allows issuers who originally sold reward points in their program for use as an incentive by third parties to repurchase points at a substantial discount, thereby reducing their liability and allowing for a trading strategy that enables points to continually be sold and repurchased. This may be a separate accounting procedure than what is used for points that are granted.

Figure 4:
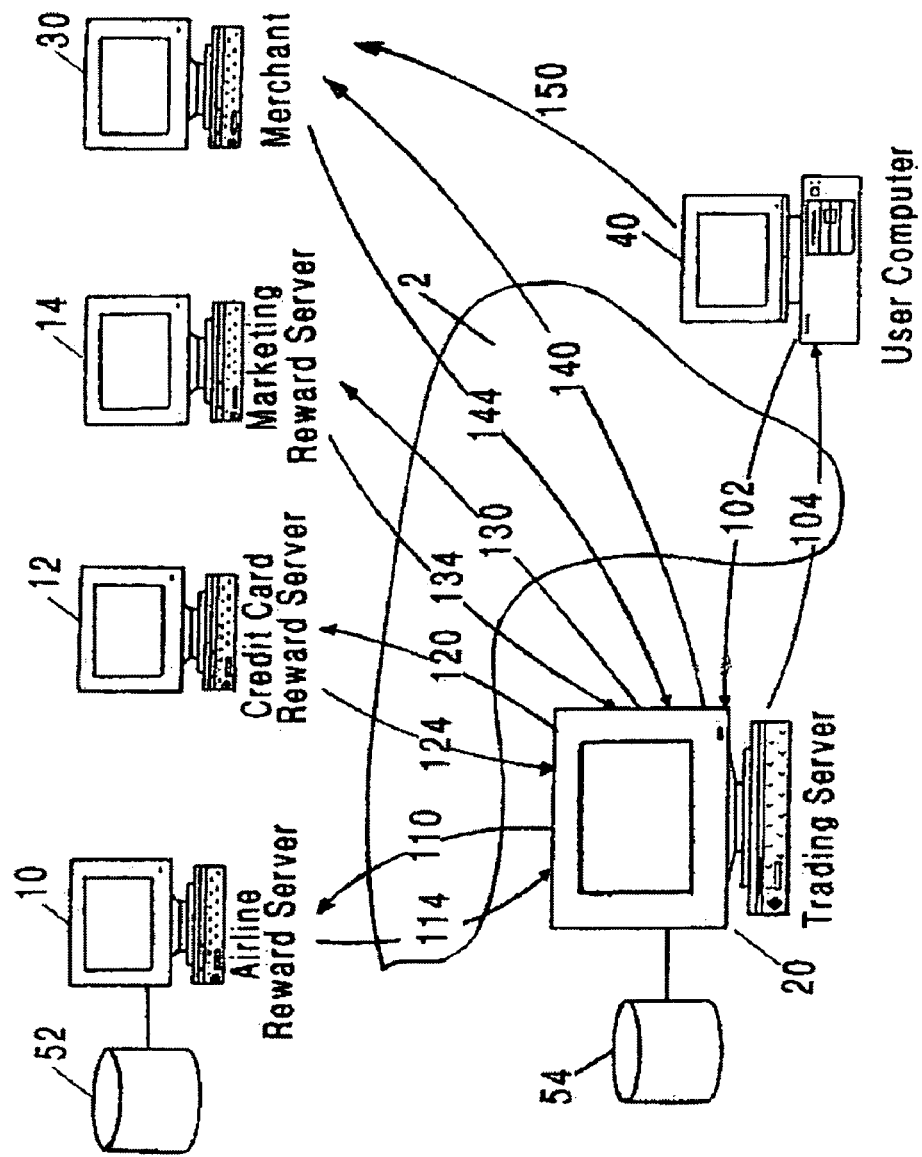
FIG. 4 is a block diagram of the components of the present invention.
Figure 5:
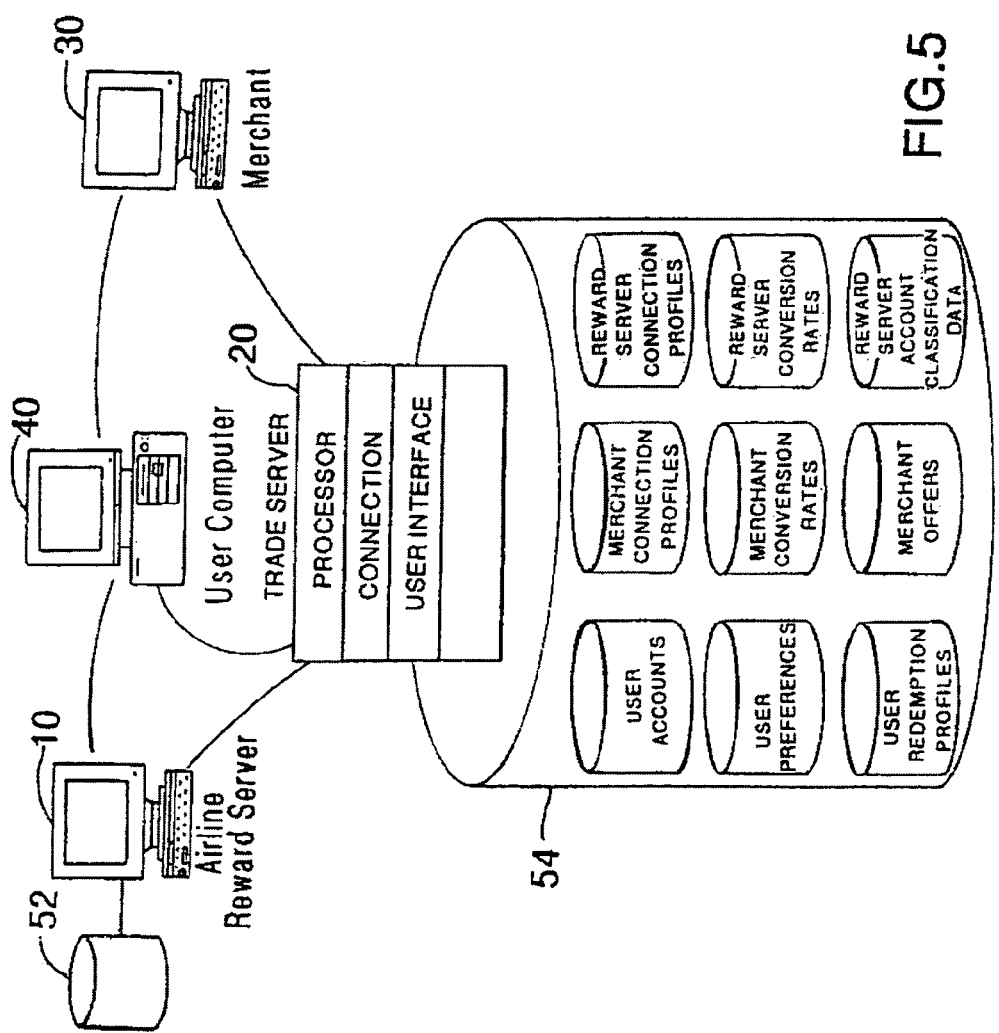
FIG. 5 is a block diagram of the system components of the present invention.
Figure 6:
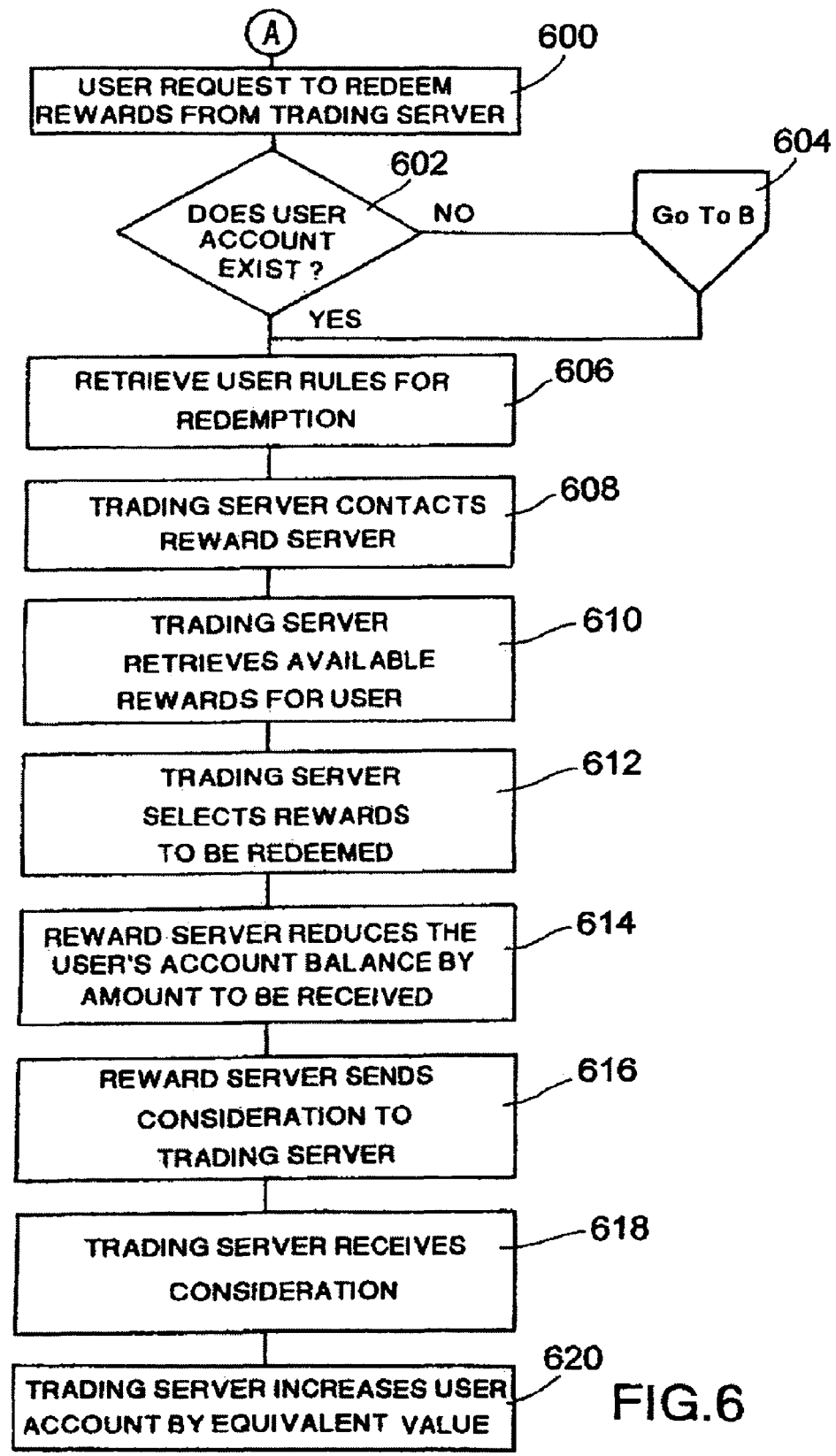
FIG. 6 is a data flow diagram of the process for a user to redeem rewards.

The method of allowing the user to redeem the accumulated reward points from one or more of a plurality of reward entities will now be described with respect to FIG. 4 and the data flow diagram of FIG. 6. The trading server system would allow users to "log in" to access the functionality provided where the user may interact with applications, forms or controls. For example, the user may view his account information by using a web browser to enter the appropriate identification information and then select buttons, links or other selectable objects to navigate to the part of the system desired. The user, from the user computer, makes a request to the trading server computer 20 at step 102, requesting redemption through the network 2 for a portion of the pre-accumulated reward points stored for the user in one of the rewarding entities. A user reward account 52 is associated with each of the reward servers but is only shown in FIG. 4 connected to the airline server for sake of clarity. The user may interactively select rewards to be redeemed, or the system may determine which rewards are to be redeemed based on a previously defined user profile rule. The trading server computer 20 "obtains" the reward points from a reward server 10, 12, 14 stored in the user's account 52 by contacting the appropriate reward server at step 110 according to the user's requirements, by using the connection parameters as defined in a database 54 on the trading server as shown in FIG. 5. In one embodiment, the trading server retrieves reward account balance information at step 114 from the reward server for the user. In another embodiment, the trading server transfers as part of the communication 110, the requested reward mileage to be redeemed. The reward server computer 10 decreases the users reward account 52 by the requested number of reward points. The term point is used to reference any earned value that has a cash equivalent or negotiable worth as in "frequent flyer" point or mile. The reward server computer 10 conveys consideration to the trading server computer 20 where the consideration corresponds to the number of reward points decreased in the user's account 52 on the reward server 10. For example, the consideration may be in the form of a monetary credit to an account that exists between the trading server and the reward server, that gets paid at the end of a predefined billing cycle (i.e. every month). The trading server computer 20 increases the reward exchange account 54 associated with the user by the received number of points. The trading server computer 20 in turn, receives the consideration from the reward server computer 10.

Figure 7:
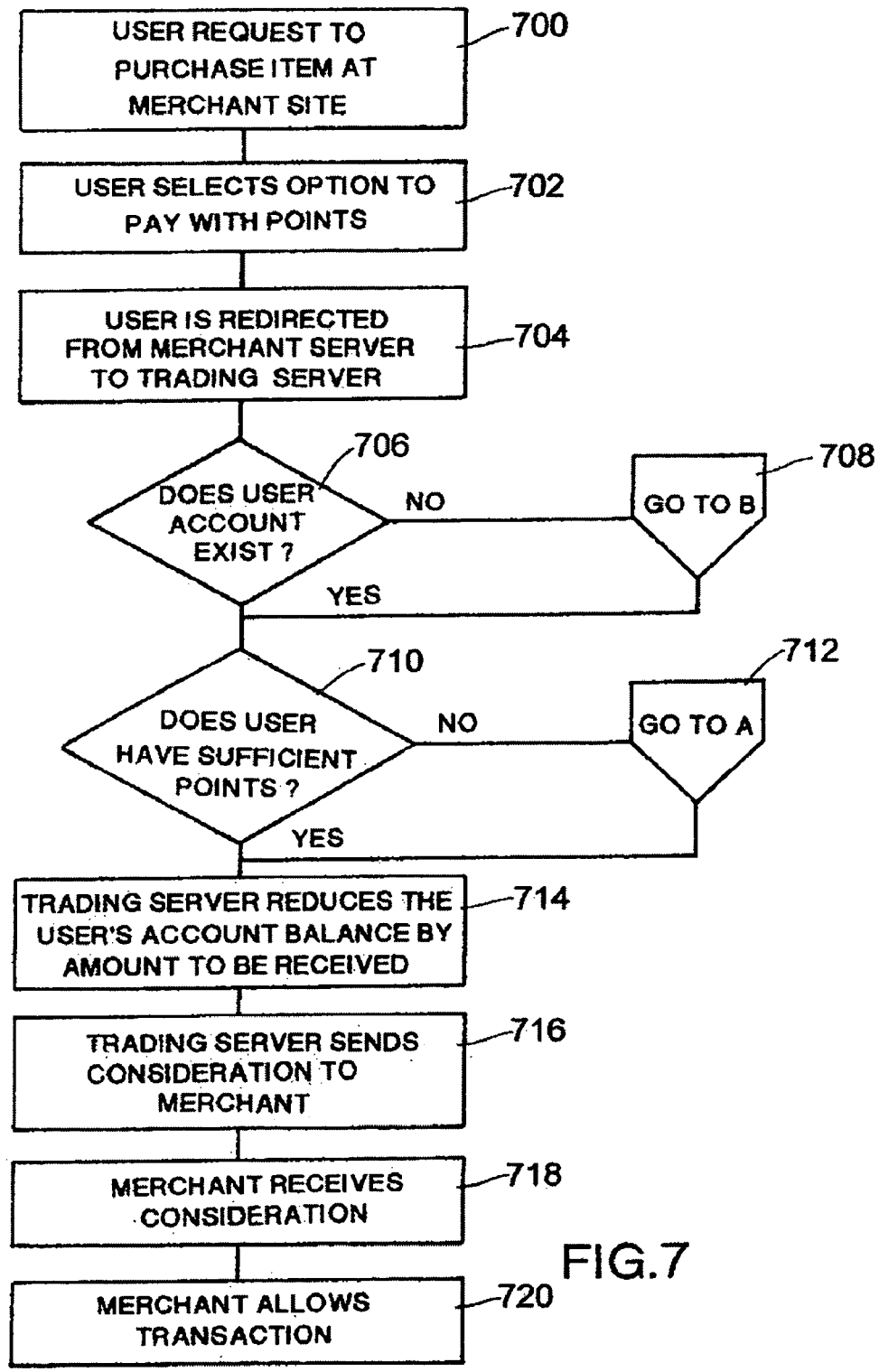
FIG. 7 is a data flow diagram of the user request for purchase of an item at a merchant site.

In the second part of the transaction (see FIG. 7), the user from a user computer 40 may make a request 150 to purchase an item from an associated merchant computer 30. In the preferred embodiment, the merchant computer system will be a networked computer system accessible via the Internet. The user would visit the site by selecting on a link from the trading server's web site or by entering the name or address of the destination site. The user may identify one or many items to be acquired from one or several merchants 30. The trading server computer 20 would confirm that the user has sufficient points to purchase the selected item by checking the user's reward exchange account 54. The trading server computer 20 would request the merchant computer to deliver the item to the user. The user delivery information may be retrieved from the trading server computer 20 or may be supplied in some other manner. The trading server computer 20 would decrease the user exchange account 54 by the number of points corresponding to the purchased item. The trading server computer 20 conveys consideration to the merchant computer 30 equivalent to the cost of the item by means well known in the art of electronic commerce (eg. by a preexisting account, credit card, etc.) In the alternative, the consideration may be a direct transfer of points to an account associated with the merchant.

Policies and profiles may be established to automatically contact each of the reward servers according to a user redemption profile (see FIG. 5) to transact the required payment for an item selected by a user. This profile may indicate the order of redemption and method of providing funds sufficient to cover the purchase after redeemable points are exhausted. For example, if a user has a preferred air carrier where the user would like to retain mileage in that reward system, the user may specify a priority of use indicating the reward resources that should be exhausted prior to accessing the most desirable rewards. Following the selection of an item to be acquired, the server may contact all of the reward resources according to this profile to selectively redeem each as required to meet the purchase price. The process may be performed in real time or as a background process where the user may select how the transaction should proceed. If the user exhausts lower personal worth resources from the reward servers, the system may be required to contact the user before the transaction is allowed to proceed to redeem points. A classification system may also be used to indicate rewards of similar worth. If for instance, a frequent flyer program supports multiple classifications of miles that may be redeemed differently, the user may optionally define how those resources should be managed during redemption. The redemption process would then honor those rules elected by the user to select from several different reward programs instead of redeeming rewards strictly on a value required from the first reward program contacted.

FIG. 8 describes the process steps involved in enrolling a user to utilize the trader server. The data entered by the user may be used in determining whether a user allows unsolicited offers to be presented from the trading server. The user's preferences for manufactured goods services, products, travel destinations, hobbies, interests or any other user entered criteria may be stored in the database for subsequent use by the system. The trading server has the ability to receive offers from reward servers or merchants which may then be directed to users based on the database profile information provided by the user (see FIG. 9).

The trading server may also be contacted in response to a button or hyperlink located on a web page accessible by the user from the airline reward server. In a similar manner, hyperlinks or calling routines may allow a user to access a reservations system or merchant from the trading server. The link would direct the user to partner or associated air carriers where the points in a user exchange account on the trading server 20 may be used to acquire reduced fare flights.

The system used to implement the aforementioned method will now be disclosed with respect to FIG. 5. The system is comprised of a trading server computer connected to a network of computers where a user interface is established whereby a user from a user computer may access the server to request the transaction to contact a reward server computer system. In the preferred embodiment, the server has memory means for storing the user account information, user profiles and rules specified by the user, system, or merchant. The trading server also has communications means to allow users to access the server and to allow the trading server to contact reward servers and processing means to interpret the rules and coordinate the contact to the respective reward servers. The processing means is adapted to allow the user to request and exchange consideration for rewards from reward servers. The processing means additionally is adapted to coordinate the exchange of consideration and increase or decrease the user exchange accounts stored in memory in response to actions performed by the user computer, reward server and merchants.

In the preferred embodiment, the memory means comprises a database structure that is used to record the transactions associated with the previously described method. Records indicating the changes and current value of user exchange accounts are updated according to the request processed by the processor.

In response to a request for redemption, the trading server looks up the contact properties of the reward server to be contacted. The user information is submitted to the reward server to display the available points that may be redeemed. In another embodiment, the request additionally contains a value to be redeemed. The processor establishes a communication link with the reward server and a transaction request is sent to the processor of the reward server. The processor of the reward server may perform actions that may allow or refuse the requested action. In another embodiment, the trading server processor may be granted direct authorization to modify the user's records in the reward server database without analysis by the processor of the reward server. A conversion rate may be applied to the transaction such that the reward server reduces the available rewards in the user's account. The reward server then transfers consideration to the trading server that corresponds to the value reduced in the reward system. In response to the receipt of the transfer or approval of the transfer, the trading server increments the user account balance to reflect the received consideration and the connection to the reward server is dropped. A transaction log may be used to record each of the transactions in case a reconciliation process is required at a later time. The increase in the user's exchange account may then be stored until a user finds an item to be purchased.

The user selects the desired object from the merchants by indicating the type of product or service to be procured. In one embodiment, the trading server contacts the merchant server to return to the user a list of products that match the user's search criteria or if the user had specified in detail what was desired, the product may be directly acquired from a merchant. A communication link is established between the trading server and the merchant computer or designee for e-commerce. Direct acquisition may be enacted by contacting the merchant computer and supplying the user indicia, the product indicia, and the redemption value sufficient to secure the transaction. In response to the transaction request, the merchant computer will receive the consideration supplied and contract for the delivery of the product. In another embodiment, the consideration required for the item selected is sent to the trading server where based on the available points in the user's exchange account the trading server will determine whether the consideration is available. An authorization process may be incorporated at this point to request authorization from the user or in a more simplified process, the consideration will be transferred to the merchant computer and the user's exchange account will be reduced. The merchant computer will receive the consideration and will effectuate a delivery transaction to be issued.

The goods may also be placed under direct control of a distribution arm of the trading service so that the user places the order with the trading service directly and the merchants are not directly involved with the sale of the goods.

Thus, the present invention provides a liability management system for issuers of reward points, which allows them to take points off the books and eliminate them, if desired, at a discount rate. This system enables the sale or repurchase of points with a trading strategy in which points need not expire.

The present system may be implemented by means of a smart card wherein frequent use points may be accumulated on the user's card every time the card is used for associated application. For example, if a user uses his smart card to pay for a hotel that normally gives reward points, those reward points may be stored on the smart card. Likewise, when the card is used for the purchase of an airline ticket, the points would be added to the smart card. The user may then redeem the accumulated reward points by inserting the card into a vender associated with a computer connected to the Internet. The trading process proceeds as described above, except that the points are obtained directly from the smart rather than a reward server.

The user may have a credit card, debit card, or stored value card that is linked to their points account in such a way as to permit them to pay for purchases with a merchant by using the card, wherein the merchant uses the existing credit card payment infrastructure as if payment were being made/authorized by a bank linked to the credit card or debit card account, but in fact the card is linked to the user's points account. In this manner, the user and merchant can use the points account to pay for purchases in a seamless manner whereby points are used for consideration rather than or as a supplement to cash and traditional credit.

Other aspects of this invention will now be disclosed that will enhance the reader's understanding of the application of this invention.

The user can purchase points from the system, borrow points from the system, etc., and basically treat the points as cash consideration for purposes of such transactions.

The system can prioritize the order of points being traded based on a predetermined set of rules such as in higher value points being issued before those with a lower value.

Merchandisers also benefit from the use of this system where another marketing channel is afforded for products that are often purchased by frequent travelers with high disposable income. Products and services encompassing jewelry, flowers, limousine transport, timeshare rental may be exchangeable for points stored in this system. Items purchased through the system may also be paid for by a combination of points and currency which might be the case when a user does not have enough accrued points to meet the purchase consideration of an item selected.

It is anticipated that high quality limited access products may benefit from the distribution methods afforded by this system. For example, companies like DeBeers and Chanel may take advantage of this distribution means without impacting the level of quality or excellence associated with their products.

Manufacturers can discount or liquidate goods for points in a manner that doesn't negatively affect the perceived value of the goods (i.e. not in direct competition with the mainstream sales). That is, the manufacturer can place overstocked, end of run type goods and the like, place them in the chain of distribution for exchange with points, and not be in direct competition with cash sales of its mainstream products.

Resort destinations that are managed by property management companies such as RCI may be integrated into this system where instead of trading accommodations with only those having similar property, it is now possible that the rental of the property may be achieved by conversion for points.

Offers may be distributed to users of this system where substantial rebates or reduced rates are described in the offer. Time sensitive product offerings can also be accommodated in the system where the value of the product is decreased according to a life span of the product. Time sensitive product offerings such as food products or concert tickets can have an associated diminishing or escalating value based on the length of the offer.

Using this system it is now possible to coordinate the products of several different providers into one package. A user of this system may therefore select an airline, hotel, car rental and Broadway show tickets in New York, individually or in a prepared package from one location by trading points where the package may not have existed before where the trading system coordinates all aspect of the transaction and reduces the user's exchange rewards in a corresponding manner.

Other purchasing leverage not specifically addressed previously may also be acquired by combining the power of a pool of high profile users of this system where these users may be allocated access to products or services not generally distributed to the remainder of the system users. Points collected in the system by these users may afford them access to limited distribution channels where higher discount levels or premium luxury products may be acquired. Direct access to cartel products such as diamonds, duty free items and other restricted access product or service offerings are also accommodated through the coordination of the trading server with these specialized service and product providers. For example, a preferred client distribution channel such as found in a European market for luxury goods would be made available to users of this system where the prices for the objects in this preferred channel may be significantly lower than retail for objects that are typically reserved for limited distribution at premium prices. The trading server may additionally have exclusive rights to allocate access to certain premium products, services, events, travel destinations or accommodations in accordance with any right or grant permitting such allocation to any user of the system. A distribution channel may make available exclusive products for all or a limited amount of the members of the system where the trading server system controls access to the offer. Parameters associated with the available quantity, duration, exchange rates, etc may be input into the system to be used in the allocation algorithm to restrict the offer. Upon user access, the trading server would, in these cases, modify the premiums offered to reflect the immediately attainable items for the current user and may additionally display or provide access to premiums that may be acquired through payment by other means (i.e. cash, charge, debit) to make up the difference between the user's available points and the points required to accept the offer.

In another embodiment of this invention, airlines seeking to provide higher levels of personalized service for their business travelers will provide access to the Internet or access to in-flight services such as video games, for a fee or in place of granting mileage rewards on transcontinental or transatlantic flights. Access to video games may be afforded to the traveler where the availability of different games depends on the number of reward points traded in by the traveler. The rewards may be converted using the trading server of this invention, where the user may opt to forego collecting mileage in return for accessing on-board entertainment provided in a standalone mode or in a linked mode. For example, users may select to play video games, access the Internet or utilize Email via a seatback or tray table mounted interface and controller. The user may optionally connect a laptop computer to an interface port of the aircraft using an Ethernet, parallel, USB connection or proprietary connector provided by the air carrier. In the preferred embodiment, the user would select the connection speed and type for communications based on whether in-flight or external services were to be accessed. Other types of business services may additionally be used and accounted for, such as using network printers or fax equipment. RF, satellite or microwave based communications may be used for real time communications where sufficient geographical coverage is provided.

The interface would allow a user to login using the frequent flyer account information or preferably, the trading server account login id and password, where the user may use points awarded from another air carrier or point server to "pay" for the services accessed. The account balance from the trading server may be transferred to the local controller prior to takeoff for each user that logs in to the trading server. Once the plane has departed, depending on the linking or access capability afforded by the air carrier or service provider, the user's account may be modified in real time or upon reconnection following landing, based on services selected by the traveler. If a real time link is supported, the user's exchange account may be periodically debited according to the services selected and duration of use.

In another aspect of the invention, an electronic bartering system is implemented, wherein product manufacturers, producers, distributors, etc. can provide surplus or overstocked goods for liquidation into the chain of supply of the system and exchange then for points as described herein. This provides an inventory management and liquidation system for these manufacturers and sellers.

In addition, the value of the reward points may fluctuate as a function of the company's performance, which may be measured by reference to the price of its stock, revenue, earnings, or some other parameter that is agreed to that reflects the relative performance of the company. In this manner, companies that perform well would provide an additional incentive to a user for using their frequent use program rather than a competitor's program. For example, all other parameters being the same, a user would likely choose the Acme credit card company over the Beta credit card company when the user determines that the Acme company performance results in a 10% increase in the number of points otherwise earned by using its credit card. The value may also fluctuate as a function of the number of points outstanding or the desirability of the issuer to reduce its liability or make it more robust.

I claim:

1. A method of operating a reward system in conjunction with a computer network, the computer network interconnected to at least one issuing bank computer operated by an issuing bank that issues a token to a user, said token comprising a user payment account ID for a user payment account at the issuing bank computer that is used to pay for purchase transactions, the method comprising:
   a. providing a reward account database in a central reward server computer that interoperates with the computer network, the reward account database storing (i) a first user reward account for transactions between the user and a first merchant and (ii) a second user reward account for transactions between the user and a second merchant, both the first user reward account and the second user reward account being identified with the user payment account ID;
   b. a user executing a first transaction with the first merchant by presenting the token to the first merchant for payment of at least part of the first transaction;
   c. a first merchant computer operated by the first merchant transmitting a first instruction to the central reward server computer to add a first set of rewards to the first user reward account using an identification of the first merchant and the user payment account ID;
   d. the user executing a second transaction with the second merchant by presenting the token to the second merchant for payment of at least part of the second transaction;
   e. a second merchant computer operated by the second merchant transmitting a second instruction to the central reward server computer to add a second set of rewards to the second user reward account using an identification of the second merchant and the user payment account ID;
   f. establishing a user reward exchange account on the central reward server computer;
   g. a user computer operated by the user providing instructions to the central reward server computer for selecting rewards from the first user reward account and from the second user reward account for exchange into the user reward exchange account; and
   h. the central reward server computer exchanging, in response to said instructions, the selected rewards from the first user reward account and the second user reward account into the user reward point exchange account.

2. The method of claim 1 further comprising the step of redeeming rewards by the steps of
   the user executing a reward redemption transaction with a redeeming merchant;
   the user utilizing rewards from the first user reward account for the reward redemption transaction;
   a redeeming merchant computer operated by the redeeming merchant transmitting a redemption instruction to the central reward server computer to reduce the first user reward account by the amount of rewards used in the transaction.

3. The method of claim 1 further comprising the step of redeeming exchanged rewards from the user reward exchange account by the steps of the user executing an exchange reward redemption transaction with a redeeming merchant;

the user utilizing exchanged rewards from the user reward exchange account for the exchange reward redemption transaction;

the user reward exchange account being reduced by the number of exchange rewards utilized for the exchange reward redemption transaction.

4. The method of claim 1 comprising the further steps of:

establishing a cluster of independently operating merchants, each of which have user reward accounts established with the reward account database in the central reward server computer;

allowing exchange of rewards from each of the independently operating merchants in the cluster into the user reward exchange account; and disallowing exchange of rewards from a merchant not a member of the cluster.

5. The method of claim 4 comprising the further step of allowing for redemption of exchanged rewards only with redeeming merchants that are members of the cluster.

6. The method of claim 2 wherein the user executes the reward redemption transaction completely with rewards from the first user reward account.

7. The method of claim 2 wherein the user executes the reward redemption transaction partially with rewards from the first user reward account and partially with other consideration.

8. A reward system comprising:

an issuing bank computer, interoperable with a computer network and operated by an issuing bank, that issues a token to a user, said token comprising a user payment account ID for a user payment account that is used to pay for purchase transactions;

a first merchant computer interoperable with the computer network and operated by a first merchant;

a second merchant computer interoperable with the computer network and operated by a second merchant;

a central reward server computer interoperable with the computer network and comprising a reward account database comprising (i) a first user reward account for storing rewards for transactions between the user and the first merchant and (ii) a second user reward account for storing rewards for transactions between the user and the second merchant, both the first user reward account and the second user reward account being identified with the user payment account ID, wherein the first merchant computer is adapted to transmit via the computer network, as part of a first transaction executed with the user during which the user presents the token to the first merchant for payment of at least part of the first transaction, a first instruction to the central reward server computer to add a first set of rewards to the first user reward account using an identification of the first merchant and the user payment account ID; and wherein the second transacting merchant computer is adapted to transmit via the computer network, as part of a second transaction executed with the user during which the user presents the token to the second merchant for payment of at least part of the second transaction, a second instruction to the central reward server computer to add a second set of rewards to the second user reward account using an identification of the second merchant and the user payment account ID, wherein the central reward server computer (A) further comprises a user reward exchange account and (B) is programmed to (i) receive instructions from a user computer operated by the user that designate the selection of rewards from the first user reward account and the second user reward account for exchange into the user reward exchange account, and (ii) exchange, in accordance with the instructions received from the user computer, the selected rewards into the user reward exchange account.

\* \* \* \* \*